(12) United States Patent
Jacobsen et al.

(10) Patent No.: US 8,935,014 B2
(45) Date of Patent: Jan. 13, 2015

(54) METHOD AND SYSTEM FOR DEPLOYING A SURVEILLANCE NETWORK

(75) Inventors: Stephen C. Jacobsen, Salt Lake City, UT (US); Marc X. Olivier, Salt Lake City, UT (US); Ralph W. Pensel, Sandy, UT (US); Fraser M. Smith, Salt Lake, UT (US)

(73) Assignee: Sarcos, LC, Salt Lake City, UT (US)

( * ) Notice: Subject to any disclaimer, the term of this patent is extended or adjusted under 35 U.S.C. 154(b) by 262 days.

(21) Appl. No.: 12/814,304

(22) Filed: Jun. 11, 2010

(65) Prior Publication Data

US 2010/0318242 A1    Dec. 16, 2010

Related U.S. Application Data

(60) Provisional application No. 61/186,290, filed on Jun. 11, 2009.

(51) Int. Cl.
| G05D 1/00 | (2006.01) |
| G05D 3/00 | (2006.01) |
| G06F 7/00 | (2006.01) |
| G06F 17/00 | (2006.01) |

(Continued)

(52) U.S. Cl.
CPC ............. *F41H 13/00* (2013.01); *F24B 12/365* (2013.01); *F42B 12/58* (2013.01); *Y10S 901/01* (2013.01)
USPC .................. 701/2; 701/23; 701/24; 701/400; 701/408; 901/1; 700/245

(58) Field of Classification Search
USPC .......... 701/2, 23, 24, 25, 400, 408; 901/1, 46, 901/50; 700/245, 900; 702/5
See application file for complete search history.

(56) References Cited

U.S. PATENT DOCUMENTS

| 1,107,874 A | 8/1914 | Appleby |
| 1,112,460 A | 10/1914 | Leavitt |

(Continued)

FOREIGN PATENT DOCUMENTS

| CA | 2512299 | 9/2004 |
| CN | 1603068 | 4/2005 |

(Continued)

OTHER PUBLICATIONS

U.S. Appl. No. 12/171,144, filed Jul. 10, 2008; Stephen C. Jacobsen; office action mailed Jan. 13, 2011.

(Continued)

*Primary Examiner* — Rami Khatib
(74) *Attorney, Agent, or Firm* — Thorpe North & Western LLP (57) ABSTRACT

A method and system for gathering information from and setting up a surveillance network within an earth-surface environment that includes inserting one or more mobile robotic devices having a sensing subsystem, a communications subsystem, and a navigation subsystem into an earth-surface environment. The mobile robotic device may be configured into a traveling pose selected from a plurality of available traveling poses, and directed using the navigation subsystem to a sensing location within the earth-surface environment. The environment may be monitored and sensed information collected may be stored or communicated to a remote location. The mobile robotic device may be configured to operate with a vehicle carrier to facilitate insertion and deployment of the robotic vehicle into the earth-surface environment.

11 Claims, 8 Drawing Sheets

(51) Int. Cl.
*F41H 13/00* (2006.01)
*F42B 12/58* (2006.01)

(56) References Cited

U.S. PATENT DOCUMENTS

| | | | |
|---|---|---|---|
| 1,515,756 A | 11/1924 | Roy |
| 1,975,726 A | 10/1934 | Martinage |
| 2,082,920 A | 6/1937 | Aulmont |
| 2,312,072 A | 3/1940 | Broadwater |
| 2,329,582 A | 9/1943 | Bishop |
| 2,345,763 A | 4/1944 | Mayne |
| 2,701,169 A | 2/1955 | Cannon |
| 2,850,147 A | 9/1958 | Hill |
| 2,933,143 A | 4/1960 | Robinson |
| 2,967,737 A | 1/1961 | Moore |
| 3,037,571 A | 6/1962 | Zelle |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |
| 3,362,492 A | 1/1968 | Hansen |
| 3,387,896 A | 6/1968 | Sobota |
| 3,489,236 A | 1/1970 | Goodwin |
| 3,497,083 A | 2/1970 | Anderson |
| 3,565,198 A | 2/1971 | Ames |
| 3,572,325 A | 3/1971 | Bazell |
| 3,609,804 A | 10/1971 | Morrison |
| 3,650,343 A | 3/1972 | Helsell |
| 3,700,115 A | 10/1972 | Johnson |
| 3,707,218 A | 12/1972 | Payne |
| 3,712,481 A | 1/1973 | Harwood |
| 3,715,146 A | 2/1973 | Robertson |
| 3,757,635 A | 9/1973 | Hickerson |
| 3,808,078 A | 4/1974 | Snellman |
| 3,820,616 A | 6/1974 | Juergens |
| 3,841,424 A | 10/1974 | Purcell |
| 3,864,983 A | 2/1975 | Jacobsen |
| 3,933,214 A | 1/1976 | Guibord |
| 3,934,664 A | 1/1976 | Pohjola |
| 3,974,907 A | 8/1976 | Shaw |
| 4,015,553 A | 4/1977 | Middleton |
| 4,051,914 A | 10/1977 | Pohjola |
| 4,059,315 A | 11/1977 | Jolliffe |
| 4,068,905 A | 1/1978 | Black |
| 4,107,948 A | 8/1978 | Molaug |
| 4,109,971 A | 8/1978 | Black |
| 4,132,279 A | 1/1979 | Van der Lende |
| 4,218,101 A | 8/1980 | Thompson |
| 4,260,053 A | 4/1981 | Onodera |
| 4,332,317 A | 6/1982 | Bahre |
| 4,332,424 A | 6/1982 | Thompson |
| 4,339,031 A | 7/1982 | Densmore |
| 4,393,728 A | 7/1983 | Larson |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. |
| 4,661,039 A | 4/1987 | Brenholt |
| 4,671,774 A | 6/1987 | Owsen |
| 4,700,693 A | 10/1987 | Lia |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea |
| 4,736,826 A | 4/1988 | White et al. |
| 4,752,105 A | 6/1988 | Barnard |
| 4,756,662 A | 7/1988 | Tanie |
| 4,765,795 A | 8/1988 | Rebman |
| 4,784,042 A | 11/1988 | Paynter |
| 4,796,607 A | 1/1989 | Allred, III |
| 4,806,066 A | 2/1989 | Rhodes |
| 4,815,319 A | 3/1989 | Clement |
| 4,815,911 A | 3/1989 | Bengtsson |
| 4,818,175 A | 4/1989 | Kimura |
| 4,828,339 A | 5/1989 | Thomas |
| 4,828,453 A | 5/1989 | Martin et al. |
| 4,848,179 A | 7/1989 | Ubhayakar |
| 4,862,808 A | 9/1989 | Hedgcoxe |
| 4,878,451 A | 11/1989 | Siren |
| 4,900,218 A | 2/1990 | Sutherland |
| 4,909,341 A | 3/1990 | Rippingale |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,997,790 A | 3/1991 | Woo et al. |
| 5,018,591 A | 5/1991 | Price |
| 5,021,798 A | 6/1991 | Ubhayakar |
| 5,022,812 A | 6/1991 | Coughlan |
| 5,046,914 A | 9/1991 | Holland et al. |
| 5,080,000 A | 1/1992 | Bubic |
| 5,130,631 A | 7/1992 | Gordon |
| 5,142,932 A | 9/1992 | Moya |
| 5,172,639 A | 12/1992 | Wiesman et al. |
| 5,174,168 A | 12/1992 | Takagi |
| 5,174,405 A | 12/1992 | Carra |
| 5,186,526 A | 2/1993 | Pennington |
| 5,199,771 A | 4/1993 | James |
| 5,205,612 A | 4/1993 | Sugden et al. |
| 5,214,858 A | 6/1993 | Pepper |
| 5,219,264 A | 6/1993 | McClure et al. |
| 5,252,870 A | 10/1993 | Jacobsen |
| 5,297,443 A | 3/1994 | Wentz |
| 5,317,952 A | 6/1994 | Immega |
| 5,337,732 A | 8/1994 | Grundfest |
| 5,337,846 A | 8/1994 | Ogaki et al. |
| 5,350,033 A | 9/1994 | Kraft |
| 5,354,124 A | 10/1994 | James |
| 5,363,935 A | 11/1994 | Schempf |
| 5,386,741 A | 2/1995 | Rennex |
| 5,413,454 A | 5/1995 | Movsesian |
| 5,426,336 A | 6/1995 | Jacobsen |
| 5,428,713 A | 6/1995 | Matsumaru |
| 5,435,405 A | 7/1995 | Schempf |
| 5,440,916 A | 8/1995 | Stone et al. |
| 5,443,354 A | 8/1995 | Stone et al. |
| 5,451,135 A | 9/1995 | Schempf |
| 5,465,525 A | 11/1995 | Mifune |
| 5,466,056 A | 11/1995 | James |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen |
| 5,672,044 A | 9/1997 | Lemelson |
| 5,697,285 A | 12/1997 | Nappi |
| 5,712,961 A | 1/1998 | Matsuo |
| 5,749,828 A | 5/1998 | Solomon |
| 5,770,913 A | 6/1998 | Mizzi |
| 5,816,769 A | 10/1998 | Bauer |
| 5,821,666 A | 10/1998 | Matsumoto |
| 5,842,381 A | 12/1998 | Feiten |
| RE36,025 E | 1/1999 | Suzuki |
| 5,878,783 A | 3/1999 | Smart |
| 5,888,235 A | 3/1999 | Jacobsen |
| 5,902,254 A | 5/1999 | Magram |
| 5,906,591 A | 5/1999 | Dario |
| 5,984,032 A | 11/1999 | Gremillion |

(56) References Cited

U.S. PATENT DOCUMENTS

| | | | |
|---|---|---|---|
| 5,996,346 A | 12/1999 | Maynard | |
| 6,016,385 A | 1/2000 | Yee | |
| 6,030,057 A | 2/2000 | Fikse | |
| 6,056,237 A | 5/2000 | Woodland | |
| 6,107,795 A | 8/2000 | Smart | |
| 6,109,705 A | 8/2000 | Courtemanche | |
| 6,113,343 A | 9/2000 | Goldenberg et al. | |
| 6,132,133 A | 10/2000 | Muro et al. | |
| 6,138,604 A | 10/2000 | Anderson | |
| 6,162,171 A | 12/2000 | Ng | |
| 6,186,604 B1 | 2/2001 | Fikse | |
| 6,203,126 B1 | 3/2001 | Harguth | |
| 6,260,501 B1 | 7/2001 | Agnew | |
| 6,263,989 B1 | 7/2001 | Won | |
| 6,264,293 B1 | 7/2001 | Musselman | |
| 6,264,294 B1 | 7/2001 | Musselman et al. | |
| 6,281,489 B1 | 8/2001 | Tubel et al. | |
| 6,323,615 B1 | 11/2001 | Khairallah | |
| 6,325,749 B1 | 12/2001 | Inokuchi et al. | |
| 6,333,631 B1 | 12/2001 | Das et al. | |
| 6,339,993 B1 | 1/2002 | Comello | |
| 6,380,889 B1 | 4/2002 | Herrmann et al. | |
| 6,394,204 B1 | 5/2002 | Haringer | |
| 6,405,798 B1 | 6/2002 | Barrett et al. | |
| 6,408,224 B1 | 6/2002 | Okamoto | |
| 6,411,055 B1 | 6/2002 | Fujita | |
| 6,422,509 B1 | 7/2002 | Yim | |
| 6,430,475 B2 | 8/2002 | Okamoto | |
| 6,431,296 B1 | 8/2002 | Won | |
| 6,446,718 B1 | 9/2002 | Barrett et al. | |
| 6,450,104 B1 | 9/2002 | Grant | |
| 6,477,444 B1 | 11/2002 | Bennett et al. | |
| 6,484,083 B1 | 11/2002 | Hayward | |
| 6,488,306 B1 | 12/2002 | Shirey et al. | |
| 6,505,896 B1 | 1/2003 | Boivin | |
| 6,512,345 B2 | 1/2003 | Borenstein | |
| 6,522,950 B1 | 2/2003 | Conca et al. | |
| 6,523,629 B1 | 2/2003 | Buttz | |
| 6,529,806 B1 | 3/2003 | Licht | |
| 6,535,793 B2 | 3/2003 | Allard | |
| 6,540,310 B1 | 4/2003 | Cartwright | |
| 6,557,954 B1 | 5/2003 | Hattori | |
| 6,563,084 B1 | 5/2003 | Bandy | |
| 6,574,958 B1 | 6/2003 | Macgregor | |
| 6,576,406 B1 | 6/2003 | Jacobsen et al. | |
| 6,595,812 B1 | 7/2003 | Haney | |
| 6,610,007 B2 | 8/2003 | Belson | |
| 6,619,146 B2 | 9/2003 | Kerrebrock | |
| 6,636,781 B1 | 10/2003 | Shen et al. | |
| 6,651,804 B2 | 11/2003 | Thomas | |
| 6,652,164 B2 | 11/2003 | Stiepel et al. | |
| 6,668,951 B2 | 12/2003 | Won | |
| 6,708,068 B1 | 3/2004 | Sakaue | |
| 6,715,575 B2 | 4/2004 | Karpik | |
| 6,725,128 B2 | 4/2004 | Hogg et al. | |
| 6,772,673 B2 | 8/2004 | Seto | |
| 6,773,327 B1 | 8/2004 | Felice | |
| 6,774,597 B1 | 8/2004 | Borenstein | |
| 6,799,815 B2 | 10/2004 | Krishnan | |
| 6,820,653 B1 | 11/2004 | Schempf | |
| 6,831,436 B2 | 12/2004 | Gonzalez | |
| 6,835,173 B2 | 12/2004 | Couvillon, Jr. | |
| 6,837,318 B1 | 1/2005 | Craig | |
| 6,840,588 B2 | 1/2005 | Deland | |
| 6,866,671 B2 | 3/2005 | Tierney | |
| 6,870,343 B2 | 3/2005 | Borenstein | |
| 6,889,118 B2 | 5/2005 | Murray et al. | |
| 6,917,176 B2 | 7/2005 | Schempf | |
| 6,923,693 B2 | 8/2005 | Borgen | |
| 6,936,003 B2 | 8/2005 | Iddan | |
| 6,959,231 B2 | 10/2005 | Maeda | |
| 7,017,687 B1 | 3/2006 | Jacobsen et al. | |
| 7,020,701 B1 | 3/2006 | Gelvin et al. | |
| 7,040,426 B1 | 5/2006 | Berg | |
| 7,044,245 B2 | 5/2006 | Anhalt et al. | |
| 7,069,124 B1 * | 6/2006 | Whittaker et al. | 701/28 |
| 7,090,637 B2 | 8/2006 | Danitz | |
| 7,137,465 B1 | 11/2006 | Kerrebrock | |
| 7,144,057 B1 | 12/2006 | Young et al. | |
| 7,171,279 B2 | 1/2007 | Buckingham et al. | |
| 7,188,473 B1 | 3/2007 | Asada | |
| 7,188,568 B2 | 3/2007 | Stout | |
| 7,228,203 B2 | 6/2007 | Koselka et al. | |
| 7,235,046 B2 | 6/2007 | Anhalt et al. | |
| 7,331,436 B1 | 2/2008 | Pack et al. | |
| 7,387,179 B2 | 6/2008 | Anhalt et al. | |
| 7,415,321 B2 | 8/2008 | Okazaki et al. | |
| 7,475,745 B1 | 1/2009 | DeRoos | |
| 7,539,557 B2 | 5/2009 | Yamauchi | |
| 7,546,912 B1 | 6/2009 | Pack et al. | |
| 7,597,162 B2 | 10/2009 | Won | |
| 7,600,592 B2 | 10/2009 | Goldenberg et al. | |
| 7,645,110 B2 | 1/2010 | Ogawa et al. | |
| 7,654,348 B2 | 2/2010 | Ohm et al. | |
| 7,775,312 B2 | 8/2010 | Maggio | |
| 7,798,264 B2 | 9/2010 | Hutcheson et al. | |
| 7,843,431 B2 | 11/2010 | Robbins et al. | |
| 7,845,440 B2 | 12/2010 | Jacobsen | |
| 7,860,614 B1 | 12/2010 | Reger | |
| 7,974,736 B2 | 7/2011 | Morin et al. | |
| 8,002,716 B2 | 8/2011 | Jacobsen et al. | |
| 8,042,630 B2 | 10/2011 | Jacobsen | |
| 8,162,410 B2 | 4/2012 | Hirose et al. | |
| 8,205,695 B2 | 6/2012 | Jacobsen et al. | |
| 8,393,422 B1 | 3/2013 | Pensel | |
| 2001/0037163 A1 | 11/2001 | Allard | |
| 2002/0038168 A1 | 3/2002 | Kasuga et al. | |
| 2002/0128714 A1 | 9/2002 | Manasas et al. | |
| 2002/0140392 A1 | 10/2002 | Borenstein | |
| 2002/0189871 A1 | 12/2002 | Won | |
| 2003/0000747 A1 | 1/2003 | Sugiyama | |
| 2003/0069474 A1 | 4/2003 | Couvillon, Jr. | |
| 2003/0097080 A1 | 5/2003 | Esashi | |
| 2003/0110938 A1 | 6/2003 | Seto | |
| 2003/0223844 A1 | 12/2003 | Schiele | |
| 2004/0030571 A1 | 2/2004 | Solomon | |
| 2004/0099175 A1 | 5/2004 | Perrot et al. | |
| 2004/0103740 A1 | 6/2004 | Townsend | |
| 2004/0168837 A1 | 9/2004 | Michaud | |
| 2004/0216931 A1 | 11/2004 | Won | |
| 2004/0216932 A1 | 11/2004 | Giovanetti | |
| 2005/0007055 A1 | 1/2005 | Borenstein et al. | |
| 2005/0027412 A1 | 2/2005 | Hobson | |
| 2005/0085693 A1 | 4/2005 | Belson et al. | |
| 2005/0107669 A1 | 5/2005 | Couvillon, Jr. | |
| 2005/0115337 A1 * | 6/2005 | Tarumi | 73/865.8 |
| 2005/0166413 A1 | 8/2005 | Crampton | |
| 2005/0168068 A1 | 8/2005 | Courtemanche et al. | |
| 2005/0168070 A1 | 8/2005 | Dandurand | |
| 2005/0225162 A1 | 10/2005 | Gibbins | |
| 2005/0235898 A1 | 10/2005 | Hobson | |
| 2005/0235899 A1 | 10/2005 | Yamamoto | |
| 2005/0288819 A1 | 12/2005 | de Guzman | |
| 2006/0000137 A1 | 1/2006 | Valdivia y Alvarado | |
| 2006/0005733 A1 | 1/2006 | Rastegar et al. | |
| 2006/0010702 A1 | 1/2006 | Roth | |
| 2006/0010998 A1 * | 1/2006 | Lloyd et al. | 73/866.5 |
| 2006/0070775 A1 | 4/2006 | Anhalt et al. | |
| 2006/0117324 A1 | 6/2006 | Alsafadi et al. | |
| 2006/0156851 A1 | 7/2006 | Jacobsen | |
| 2006/0225928 A1 | 10/2006 | Nelson | |
| 2006/0229773 A1 | 10/2006 | Peretz | |
| 2006/0290779 A1 * | 12/2006 | Reverte et al. | 348/84 |
| 2007/0029117 A1 | 2/2007 | Goldenberg et al. | |
| 2007/0156286 A1 | 7/2007 | Yamauchi | |
| 2007/0193790 A1 | 8/2007 | Goldenberg et al. | |
| 2007/0260378 A1 | 11/2007 | Clodfelter | |
| 2007/0293989 A1 | 12/2007 | Norris | |
| 2008/0115687 A1 | 5/2008 | Gal et al. | |
| 2008/0136254 A1 | 6/2008 | Jacobsen | |
| 2008/0164079 A1 | 7/2008 | Jacobsen | |
| 2008/0167752 A1 * | 7/2008 | Jacobsen | 700/250 |
| 2008/0168070 A1 | 7/2008 | Naphade | |
| 2008/0192569 A1 * | 8/2008 | Ray et al. | 367/15 |

(56) References Cited

U.S. PATENT DOCUMENTS

| | | |
|---|---|---|
| 2008/0215185 A1 | 9/2008 | Jacobsen |
| 2008/0217993 A1 | 9/2008 | Jacobsen |
| 2008/0272647 A9 | 11/2008 | Hirose et al. |
| 2008/0281231 A1 | 11/2008 | Jacobsen |
| 2008/0281468 A1 | 11/2008 | Jacobsen |
| 2008/0284244 A1 | 11/2008 | Hirose et al. |
| 2009/0025988 A1 | 1/2009 | Jacobsen et al. |
| 2009/0030562 A1 | 1/2009 | Jacobsen |
| 2009/0035097 A1 | 2/2009 | Loane |
| 2009/0095209 A1* | 4/2009 | Jamieson ............. 114/312 |
| 2009/0171151 A1 | 7/2009 | Choset et al. |
| 2009/0212157 A1* | 8/2009 | Arlton et al. ............. 244/63 |
| 2010/0030377 A1 | 2/2010 | Unsworth |
| 2010/0036544 A1* | 2/2010 | Mashiach ................. 701/2 |
| 2010/0174422 A1 | 7/2010 | Jacobsen |
| 2010/0201185 A1 | 8/2010 | Jacobsen |
| 2010/0201187 A1 | 8/2010 | Jacobsen |
| 2010/0258365 A1 | 10/2010 | Jacobsen |
| 2010/0268470 A1* | 10/2010 | Kamal et al. ............. 702/13 |
| 2010/0317244 A1 | 12/2010 | Jacobsen |
| 2010/0318242 A1 | 12/2010 | Jacobsen |
| 2012/0185095 A1 | 7/2012 | Rosenstein et al. |
| 2012/0205168 A1 | 8/2012 | Flynn et al. |
| 2012/0264414 A1 | 10/2012 | Fung |
| 2012/0277914 A1 | 11/2012 | Crow et al. |

FOREIGN PATENT DOCUMENTS

| | | |
|---|---|---|
| CN | 2774717 | 4/2006 |
| CN | 1970373 | 5/2007 |
| DE | 3025840 | 2/1982 |
| DE | 3626238 | 2/1988 |
| DE | 3626328 | 2/1988 |
| DE | 19617852 | 10/1997 |
| DE | 19714464 | 10/1997 |
| DE | 19704080 | 8/1998 |
| DE | 10018075 | 1/2001 |
| DE | 102004010089 | 9/2005 |
| EP | 0105418 | 4/1984 |
| EP | 0584520 | 3/1994 |
| EP | 0818283 | 1/1998 |
| EP | 0924034 | 6/1999 |
| EP | 1444043 | 8/2004 |
| EP | 1510896 | 3/2005 |
| EP | 1832501 | 9/2007 |
| EP | 1832502 | 9/2007 |
| FR | 2638813 | 5/1990 |
| FR | 2660730 | 10/1991 |
| FR | 2850350 | 7/2004 |
| GB | 1199729 | 7/1970 |
| JP | S51-106391 | 8/1976 |
| JP | 52 57625 | 5/1977 |
| JP | 58-89480 | 5/1983 |
| JP | SHO 58-80387 | 5/1983 |
| JP | S59-139494 | 9/1984 |
| JP | 60015275 | 1/1985 |
| JP | 60047771 | 3/1985 |
| JP | 60060516 | 4/1985 |
| JP | 60139576 | 7/1985 |
| JP | SHO 60-211315 | 10/1985 |
| JP | 61001581 | 1/1986 |
| JP | SHO 61-1581 | 1/1986 |
| JP | SHO 61-180885 | 1/1986 |
| JP | SHO61-020484 | 2/1986 |
| JP | SHO61-054378 | 3/1986 |
| JP | SHO61-075069 | 4/1986 |
| JP | 61089182 | 5/1986 |
| JP | SHO 62-36885 | 3/1987 |
| JP | S62-165207 A | 7/1987 |
| JP | SHO 2-162626 | 10/1987 |
| JP | SHO 63-32084 | 3/1988 |
| JP | 63306988 | 12/1988 |
| JP | 04092784 | 3/1992 |
| JP | H04-126656 | 4/1992 |
| JP | HEI 5-3087 | 1/1993 |
| JP | 05147560 | 6/1993 |
| JP | HEI05-270454 | 10/1993 |
| JP | HEI 5-286460 | 11/1993 |
| JP | 06-115465 | 4/1994 |
| JP | HEI 8-133141 | 11/1994 |
| JP | 2007-216936 | 8/1995 |
| JP | 7329841 | 12/1995 |
| JP | HEI 7-329837 | 12/1995 |
| JP | HEI 9-142347 | 6/1997 |
| JP | 52122431 | 9/1997 |
| JP | HEI11-347970 | 12/1999 |
| JP | 2003-237618 | 2/2002 |
| JP | 2003-019985 | 1/2003 |
| JP | 2003-315486 | 11/2003 |
| JP | 2004/080147 A | 3/2004 |
| JP | 03535508 | 6/2004 |
| JP | 2005-19331 | 1/2005 |
| JP | 2005-081447 | 3/2005 |
| JP | 2005111595 | 4/2005 |
| JP | 2006-510496 | 3/2006 |
| JP | 2007-237991 | 9/2007 |
| JP | 2010-509129 | 3/2010 |
| WO | WO 87/02635 | 5/1987 |
| WO | WO 96/37727 | 11/1996 |
| WO | WO 97/26039 | 7/1997 |
| WO | WO 00/10073 | 2/2000 |
| WO | WO 02/16995 | 2/2002 |
| WO | WO 02/095517 | 11/2002 |
| WO | WO 03/030727 | 4/2003 |
| WO | WO 03037515 | 5/2003 |
| WO | WO 2004/056537 | 7/2004 |
| WO | WO 2005/018428 | 3/2005 |
| WO | WO 2006068080 | 6/2006 |
| WO | WO 2008/076194 | 6/2008 |
| WO | WO 2008/127310 A2 | 10/2008 |
| WO | WO 2008/135978 | 11/2008 |
| WO | WO 2008/049050 | 1/2009 |
| WO | WO 2009/009673 | 1/2009 |
| WO | WO 2010/070666 A1 | 6/2010 |
| WO | WO 2012/061932 A1 | 5/2012 |

OTHER PUBLICATIONS

U.S. Appl. No. 12/964,996, filed Jan. 27, 2010; Stephen C. Jacobsen; office action mailed Jan. 26, 2011.
PCT Application PCT/US2010/038339; filed Jun. 11, 2010; Stephen C. Jacobsen; ISR mailed Feb. 9, 2011.
U.S. Appl. No. 12/765,618, filed Apr. 22, 2010; Stephen C. Jacobsen; office action issued Sep. 20, 2011.
U.S. Appl. No. 12/350,693, filed Jan. 8, 2009; Stephen C. Jacobsen; office action issued Oct. 12, 2011.
U.S. Appl. No. 11/985,320, filed Nov. 13, 2007; Stephen C. Jacobsen; office action issued Nov. 25, 2011.
U.S. Appl. No. 12/814,302, filed Jun. 11, 2010; Stephen C. Jacobsen; office action issued Jan. 10, 2012.
U.S. Appl. No. 11/985,336, filed Nov. 13, 2007; Stephen C. Jacobsen; notice of allowance issued Jan. 19, 2012.
Mehling et al.; A Minimally Invasive Tendril robot for In-Space Inspection; Feb. 2006; The First IEEE-RAS-EMBS International Conference on Biomedical Robotics and Biomechatronics (BioRob '06) pp. 690-695.
U.S. Appl. No. 11/985,320, filed Nov. 13, 2007; Stephen C. Jacobsen; office action issued Apr. 25, 2012.
U.S. Appl. No. 12/350,693, filed Jan. 8, 2009; Stephen C. Jacobsen; office action issued Mar. 28, 2012.
U.S. Appl. No. 12/814,302, filed Jun. 11, 2010; Stephen C. Jacobsen; office action issued Apr. 18, 2012.
U.S. Appl. No. 11/985,336, filed Nov. 13, 2007; Stephen C. Jacobsen; office action issued Jun. 14, 2011.
U.S. Appl. No. 12/820,881, filed Jun. 22, 2010; Stephen C. Jacobsen; notice of allowance issued Jun. 9, 2011.
U.S. Appl. No. 12/765,618, filed Apr. 22, 2010; Stephen C. Jacobsen; Notice of Allowance issued Feb. 2, 2012.
U.S. Appl. 12/171,146, filed Jul. 10, 2008; Stephen C. Jacobsen; office action issued Feb. 9, 2012.

(56) References Cited

OTHER PUBLICATIONS

U.S. Appl. No. 12/765,618, filed Apr. 22, 2010; Stephen C. Jacobsen; office action issued Apr. 6, 2011.
U.S. Appl. No. 11/985,320, filed Nov. 13, 2007; Stephen C. Jacobsen; office action issued Apr. 12, 2011.
U.S. Appl. No. 11/985,324, filed Nov. 13, 2007; Stephen C. Jacobsen; notice of allowance issued Apr. 18, 2011.
U.S. Appl. No. 12/151,730, filed May 7, 2008; Stephen C. Jacobsen; notice of allowance issued Apr. 15, 2011.
U.S. Appl. No. 12/171,146, filed Jul. 10, 2008; Stephen C. Jacobsen; office action dated Aug. 20, 2012.
U.S. Appl. No. 13/181,380, filed Jul. 12, 2011; Stephen C. Jacobsen; office action dated Jul. 17, 2012.
U.S. Appl. No. 12/814,302, filed Jun. 11, 2010; Stephen C. Jacobsen; notice of allowance dated Jul. 25, 2012.
U.S. Appl. No. 12/694,996, filed Jan. 27, 2010; Stephen C. Jacobsen; Office Action Issued Sep. 30, 2010.
U.S. Appl. No. 12/151,730, filed May 7, 2008; Stephen C. Jacobsen; Office Action Issued Nov. 15, 2010.
U.S. Appl. No. 12/171,144, filed Jul. 10, 2008; Stephen C. Jacobsen; Office Action Issued Aug. 11, 2010.
U.S. Appl. No. 11/985,324, filed Nov. 13, 2007; Stephen C. Jacobsen; Office Action Issued Nov. 1, 2010.
PCT/US10/38331; filed Jun. 11, 2009; Stephen C. Jacobsen; Isr Issued Dec. 1, 2010.
U.S. Appl. No. 12/820,881, filed Jun. 22, 2010; Stephen C. Jacobsen; office action issued Nov. 30, 2010
Arnold, Henry, "Cricket the robot documentation." online manual available at http://www.parallaxinc.com, 22 pages.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, 2000, pp. 2079-2082, Japan.
Braure, Jerome, "Participation to the construction of a salamander robot: exploration of the morphological configuration and the locomotion controller", Biologically Inspired Robotics Group, master thesis, Feb. 17, 2004, pp. 1-46.
Jacobsen, et al., Advanced intelligent mechanical sensors (AIMS), Proc. IEEE Trandsucers Jun. 24-27, 1991, abstract only, San Fransico, CA.
Jacobsen, et al., "Research robots for applications in artificial intelligence, teleoperation and entertainment", International Journal of Robotics Research, 2004, pp. 319-330, vol. 23.
Jacobsen, et al., "Multiregime MEMS sensor networks for smart structures," Procs. SPIE 6th Annual Inter. Conf. on Smart Structes and Materials, Mar. 1-5, 1999, pp. 19-32, vol. 3673, Newport Beach CA.
MaClean et al., "A digital MEMS-based strain gage for structural health monitoring," Procs. 1997 MRS Fall Meeting Symposium, Nov. 30-Dec. 4, 1997, pp. 309-320, Boston Massachusetts.
Berlin et al., "MEMS-based control of structural dynamic instability", Journal of Intelligent Material Systems and Structures, Jul. 1998 pp. 574-586, vol. 9.
Goldfarb, "Design and energetic characterization of a liquid-propellant-powered actuator for self-powered robots," IEEE Transactions on Mechatronics, Jun. 2003, vol. 8 No. 2.
Dowling, "Limbless Locomotion: Learning to crawl with a snake robot," The Robotics Institute at Carnegie Mellon University, Dec. 1997, pp. 1-150.
Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proccedings/SESSION%2026/m116-Heverly.pdf.
NASA: "Nasa's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.
Nilas Sueset et al., "A PDA-based high-level human-robot interaction" Robotics, Automation and Mechatronics, IEEE Conference Singapore, Dec. 1-3, 2004, vol. 2, pp. 1158-1163.
U.S. Appl. No. 12/350,693, filed Jan. 8, 2009; Stephen C. Jacobsen; notice of allowance dated Sep. 20, 2012.
U.S. Appl. No. 13/481,631, filed May 25, 2012; Ralph W. Pensel; notice of allowance dated Sep. 24, 2012.
U.S. Appl. No. 12/814,304, filed Jun. 11, 2010; Stephen C. Jacobsen; office action dated Nov. 13, 2012.
U.S. Appl. No. 12/117,233, filed May 8, 2008; Stephen C. Jacobsen; office action dated Nov. 23, 2012.
Mehling, et al.; "A Minimally Invasive Tendril Robot for In-Space Inspection"; Biomedical Robotics and Biomechatronis, 2006.
Celaya et al; Control of a Six-Legged Robot Walking on Abrupt Terrain; Proceedings of the 1996 IEE International Conference on Robotics and Automation, Minneapolis, Minnesota; Apr. 1996; 6 pages.
Burg et al; Anti-Lock Braking and Traction Control Concept for All-Terrain Robotic Vehicles; Proceedings of the 1997 IEE International Conference on Robotics and Automation; Albuquerque, New Mexico; Apr. 1997; 6 pages.
U.S. Appl. No. 12/117,233, filed May 8, 2008; Stephen C. Jacobsen. office action dated Nov. 23, 2012.
U.S. Appl. No. 13/181,380, filed Jul. 12, 2011; Stephen C. Jacobsen; notice of allowance dated Dec. 24, 2012.
U.S. Appl. No. 12/171,146, filed Jul. 10, 2008; Stephen C. Jacobsen; office action dated Mar. 6, 2013.
U.S. Appl. No. 12/117,233, filed May 8, 2000; Stephen C. Jacobsen; office action dated May 6, 2013.
U.S. Appl. No. 12/171,146, filed Jul. 10, 2008; Stephen C. Jacobsen; notice of allowance dated Jun. 24, 2013.
Schenker, et al.; "Reconfigurable robots for all terrain exploration"; 2000, CIT.
Blackburn, et al.; Improved mobility in a multi-degree-of-freedom unmanned ground vehicle; *Unmanned Ground Vehicles Technology VI;* Proceedings of SPIE vol. 5422; Sep. 2, 2004; 124-134; vol. 5422; SPIE.
U.S. Appl. No. 12/117,233, filed May 8, 2008; Stephen C. Jacobsen; office action dated Dec. 19, 2013.
PCT Application PCT/US2013/067840; filed Oct. 31, 2013; Raytheon Company; International Search Report mailed Aug. 29, 2014.
Simmons et al.; Coordinated Deployment of Multiple, Heterogeneous Robots; School of Computer Science, Carnegie Mellon University, Pittsburgh, PS; Honeywell Technology Center, Minneapolis, MN; Intelligent Robot Systems; 2000; pp. 2254-2260; vol. 3.
U.S. Appl. No. 13/665,669, filed Oct. 31, 2012; Fraser M. Smith; office action dated Jul. 7, 2014.

* cited by examiner

METHOD AND SYSTEM FOR DEPLOYING A SURVEILLANCE NETWORK

RELATED APPLICATIONS

This application claims the benefit of U.S. Provisional Application No. 61/186,290, filed Jun. 11, 2009, and entitled "Surveillance Network Deployment Methods," which application is incorporated by reference in its entirety herein.

FIELD OF THE INVENTION

The present invention relates to surveillance networks, and more particularly to the deployment of surveillance networks.

BACKGROUND OF THE INVENTION AND RELATED ART

Warfare, police activity, counter-terrorism and similar situations can subject individuals to significant risks of injury. An important aspect of such situations is information gathering. Accurate and timely information can help to reduce the risk of personnel injury, avoid escalation of an incident, or provide a tactical advantage in a conflict situation. Unfortunately, gathering information presents its own risks. Reconnaissance personnel sent into undercover situations or war zones face the risk of detection, capture, injury, and the like.

One significant improvement in surveillance techniques is the use of unmanned robotic devices for information gathering. Using a remotely-controlled robotic device can, for example, help to avoid the need to expose individuals to a dangerous environment. Robotic devices have been used with success in defusing bombs, searching for earthquake survivors, and space exploration. Unmanned aerial vehicles have achieved great success in wartime scenarios. Unmanned aerial vehicles allow surveillance of a battlefield area without requiring exposure of a pilot to threats.

While successful, unmanned aerial vehicles have a number of limitations. For example, aerial vehicles tend to perform best at monitoring environments that are visible from an aerial vantage point, and therefore have difficulty observing concealed (e.g., under thick vegetation), indoor, or underground activities. Unmanned aerial vehicles also tend to be quite expensive and require specially-trained personnel to operate.

One alternative to information gathering using unmanned aerial vehicles is the placement of networks of fixed-position information sensors (e.g., intrusion detection systems, roadside traffic monitors, and the like). Fixed-position information sensors can be inexpensive, but must be placed into the environment to be monitored. Accordingly, installation of a fixed-position information-gathering network can subject individuals to undesired risks.

While ground robotic devices offer the potential to address some of these shortcomings, to date, little use has been made of ground robotic devices for information gathering. One challenge in the use of ground robotic devices is placement (and removal) of the devices into an environment to be monitored, particularly if covert surveillance is desired.

SUMMARY OF THE INVENTION

Accordingly, it has been recognized that improved techniques for deployment of information gathering equipment is needed.

In one embodiment, the present invention resides in a method for gathering information from within an earth-surface environment. The method includes inserting one or more mobile robotic devices having a sensing subsystem, a communications subsystem, and a navigation subsystem into an earth-surface environment. The method also includes configuring the mobile robotic device into a traveling pose selected from a plurality of available traveling poses, and directing the mobile robotic device with the navigation system to a sensing location within the earth-surface environment. The method further includes monitoring the sensing subsystem for information and communicating the information from the sensing subsystem to a remote location. The method can also include removing the mobile robotic device from the sensing location within the earth-surface environment.

In another embodiment, the present invention resides in a method of concealing a surveillance network within a earth-surface environment. The method includes inserting a plurality of mobile robotic devices into a earth-surface environment, configuring each of the mobile robotic devices into a traveling pose selected from a plurality of available traveling poses, and directing each of the mobile robotic devices to a different concealed sensing location within the earth-surface environment. The method further includes sensing information about the earth-surface environment using sensors disposed on the each of the mobile robotic devices, or on one or more pods carryable and deployable by the robotic devices, and communicating the information to a remote location.

In still another embodiment, the present invention resides in a method of establishing a concealed surveillance network within a earth-surface environment. The method includes inserting one or more mobile robotic devices into a earth-surface environment, directing the mobile robotic devices to a plurality of concealed sensing locations within the earth-surface environment and, optionally, depositing one or more sensing pods at each of the concealed sensing locations. The method further includes sensing information about the environment using sensors disposed on the robotic devices themselves and/or each sensing pod, and communicating the information from the robotic devices and/or the sensing pods to a remote location.

In still another embodiment, the present invention resides in a system for surreptitiously gathering information from within an earth-surface environment, comprising at least one mobile robotic device operable within an earth-surface environment, which is configurable into at least one deployment pose and a plurality of traveling poses, the mobile robotic device comprising a multi-frame body having multiple single-track units coupled by an active articulating linkage, a navigation subsystem for selecting the optimum traveling pose for the earth-surface environment, and a sensing subsystem for collecting information from the earth-surface environment. The system further comprises a carrier vehicle operable with the mobile robotic device as configured in the at least one deployment pose to facilitate deployment of the mobile robotic device into the earth-surface environment, wherein the mobile robotic device is separable from the carrier vehicle and reconfigurable into one of the plurality of traveling poses so as to enable the mobile robotic device to locate to a first sensing location within the earth-surface environment.

In still another embodiment, the present invention resides in a system for surreptitiously gathering information from within an earth-surface environment, comprising a plurality of mobile robotic devices operable within an earth-surface environment, each being configurable into at least one deployment pose and a plurality of traveling poses, the mobile robotic devices comprising a multi-frame body having multiple single-track units coupled by an active articulating linkage, a navigation subsystem for selecting the optimum traveling pose for the earth-surface environment, and a sensing subsystem for collecting information from the earth-surface environment. The system further comprises a carrier vehicle operable with one or more of the mobile robotic devices as configured in the at least one deployment pose to facilitate deployment of the mobile robotic devices into the earth-surface environment, wherein the mobile robotic devices are separable from the carrier vehicle and reconfigurable into one of the plurality of traveling poses so as to enable the mobile robotic devices to locate to a first sensing location within the earth-surface environment, and wherein the plurality of mobile robotic devices operate to facilitate the establishment of a surveillance network within the earth-surface environment.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which.

DETAILED DESCRIPTION OF EXEMPLARY EMBODIMENTS

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by reference numbers throughout. A letter after a reference designator number represents an instance of an element having the reference designator number.

Figure 1:
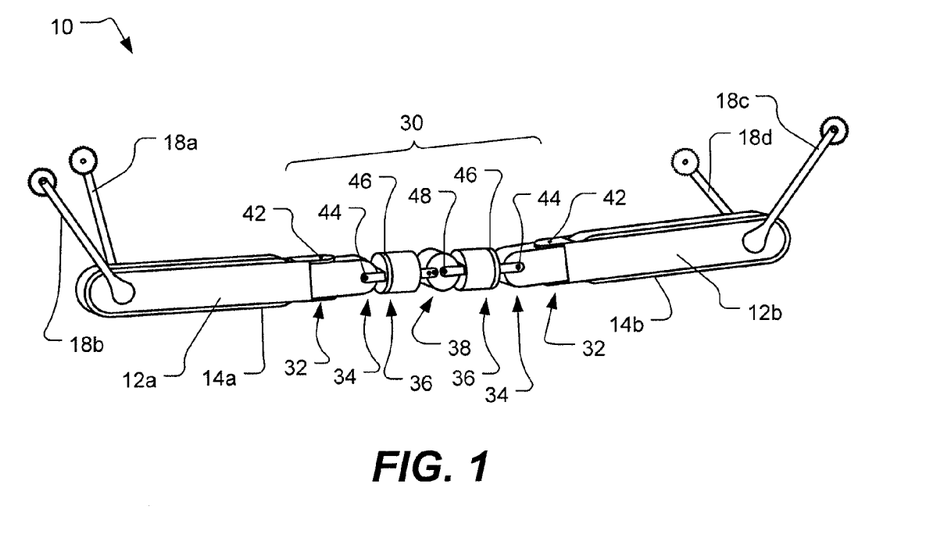
FIG. 1 is a perspective illustration of an exemplary mobile robotic device useful within embodiments of the present invention.

Turning now to the invention in general terms, surveillance and other types of information gathering can be performed by mobile ground robotic devices. For example, FIG. 1 illustrates one example of a mobile robotic device or Unmanned Ground Vehicle (UGV) that may be used in embodiments of the present invention. The mobile robotic device 10 is relatively small, and thus easily concealed. For example, the mobile robotic device may have an overall length between about 2 inches to about 70 inches, and have a cross sectional diameter of about 1 inch to about 4 inches. Of course, the mobile robotic device 10 may be configured smaller or larger as circumstances may require.

The mobile robotic device 10 can include a first frame unit 12a and a second frame unit 12b (shown here coupled in tandem), with each frame unit having a continuous track 14a, 14b, disposed thereon. Individually articulating arms 18a, 18b, 18c, 18d can be disposed in opposing pairs on each frame unit, and an active actuated linkage arm 30 can couple the first frame unit and second frame unit.

The actuated linkage arm can provide controllable bending about at least one axis, and preferably about multiple axes to provide the robotic device with a plurality of degrees of freedom via a multiple degree of freedom actuated linkage arm that allows the robotic device to be configured into different poses for achieving different tasks. For example, the actuated linkage arm can include joints providing bending about seven different axes as shown here. The multiple degree of freedom linkage arm can include a first wrist-like actuated linkage coupled to the first frame, a second wrist-like actuated linkage coupled to the second frame, and an elbow-like actuated joint coupled between the first and second wrist-like actuated linkage.

The wrist-like actuated linkages can be configured in various ways. For example, the wrist-like actuated linkage can include a series coupled combination of a yaw bending joint, a pitch bending joint, and a rotational joint, with various arm linkages coupled between the joints and the frame. For example, in accordance with an embodiment of the present invention, a wrist-like actuated linkage can include a yaw arm 32 coupled to the frame 12,14 through a yaw bending joint 42 having a yaw axis which provides yaw bending about a lateral axis orientated substantially vertically relative to the frame when the continuous track 14a,14b is in a nominal operating position and in contact with a substantially horizontal supporting surface. The wrist-like actuated linkage can also include a pitch arm 36 coupled to the yaw arm 32 through a pitch bending joint 44 providing pitch bending about a lateral axis oriented substantially horizontally relative to the frame. The wrist-like actuated linkage can also include a rotary or roll joint 36 providing roll rotation about a roll axis 46 and the longitudinal axis of the pitch arm. As shown in FIG. 1, two wrist-like actuated linkages are coupled together and to respective first and second frame units 12a,12b, wherein the actuated linkage arm 30 comprises two active yaw joints 32 that provide bending about a yaw axis 42, two active pitch joints 34 that provide bending about a pitch axis 44, two active roll joints 36 that provide rotation about a roll axis 46 and one additional active bending joint 38 that provides rotation about a translatable axis 48.

As indicated, this particular arrangement of joints provides significant flexibility in the pose that the mobile robotic device can assume. For example, commonly-owned co-pending U.S. patent application Ser. No. 11/985,323, filed Nov. 13, 2007, and entitled "Serpentine Robotic Crawler", incorporated by reference herein, describes various systems, poses and movement moves enabled by this particular arrangement of joints. Furthermore, the mobile robotic device can be remotely configured into a transportation or traveling pose, selected from a plurality of available poses, that is best suited for the immediate terrain over which device is traveling or for which it is intended to travel.

Operating the serpentine robotic crawler can include actively controlling and articulating the one or more joints within the actuated multi-degree of freedom linkage arm to establish a desired pose for the serpentine robotic crawler. Drive operation of the continuous tracks can be coordinated with articulation of the high degree of freedom actuated linkage arm to further control the pose and provide movement of the robotic device.

Figure 2:
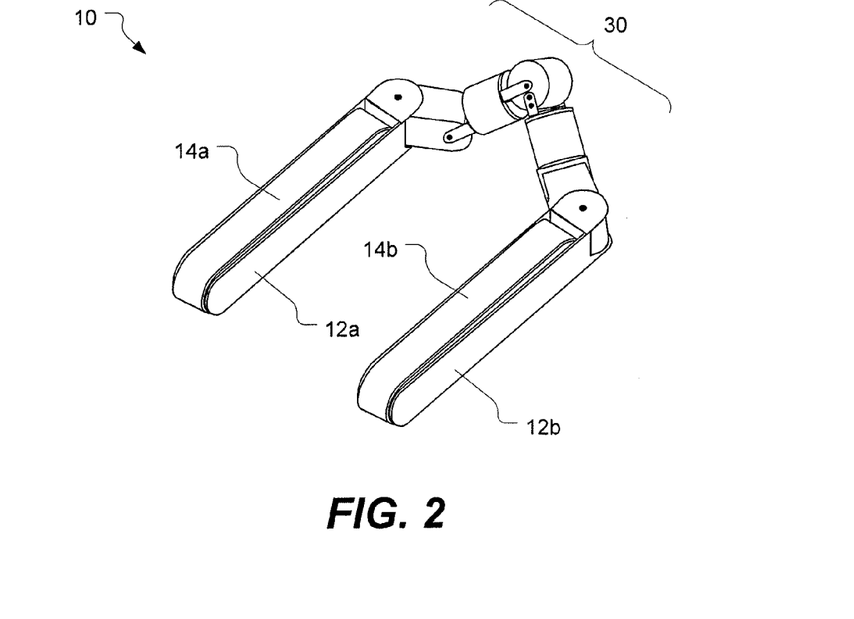
FIG. 2 is a perspective illustration of the mobile robotic device of FIG. 1 configured into a tank pose.

The mobile robotic device can be configured into a first traveling pose referred to herein as the "tank" configuration, where the first frame 12a and second frame 12b, although coupled in tandem, are positioned side by side as illustrated in FIG. 2. The frames extend in the same direction from the actuated linkage arm 30, and can be, but need not be, parallel. The tank configuration provides lateral stability to the mobile robotic device 10, for example when traversing a steep slope. The mobile robotic device can be moved in a forward and reserve direction by driving the continuous tracks 14a, 14b in the same direction, and turned by driving the continuous tracks in the opposite direction. In general, moving the mobile robotic device in the tank-like configuration can involve applying different drive speeds (including opposite directions) to the continuous tracks.

Figure 3:
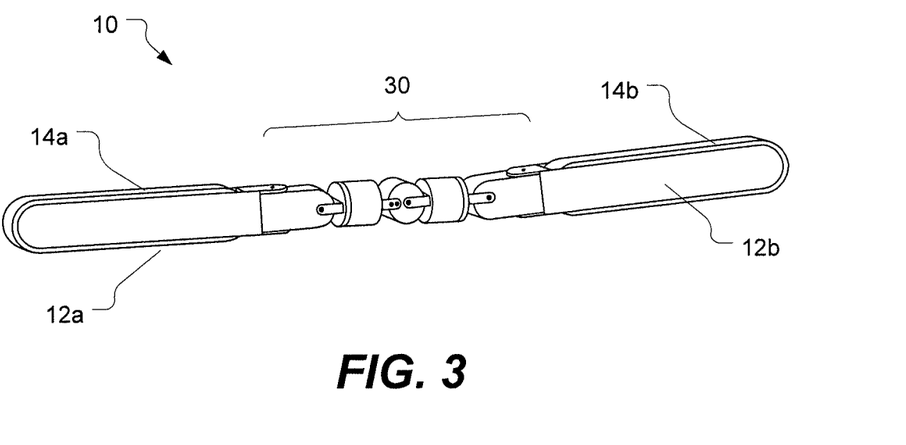
FIG. 3 is a perspective illustration of the mobile robotic device of FIG. 1 configured into a train pose.

The mobile robotic device can be configured into a second traveling pose referred to herein as the "train" configuration, is where the first frame 12a and second frame 12b are aligned end-to-end, as illustrated in FIG. 3. The frames can be, but need not be, parallel. The train configuration provides a smaller profile, allowing the mobile robotic device 10 to enter small holes, pipes, tunnels, and the like. The train configuration also allows the mobile robotic device to bridge gaps and holes. In the train configuration, forward and reverse motion is provided by driving the continuous tracks 14a, 14b. Note that, relative to the tank configuration, the direction sense of one of the continuous tracks is reversed. Turning of the mobile robotic device can be provided by operation of the actuated linkage arm 30 to create an angle between the first frame and second frame.

Figure 4:
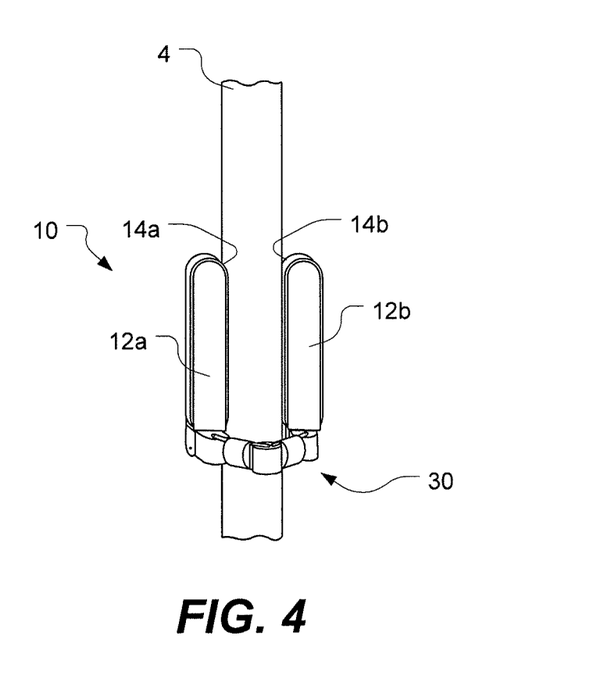
FIG. 4 is a perspective illustration of the mobile robotic device of FIG. 1 configured into an outside-climbing pose.

The mobile robotic device can also be configured into another traveling pose suitable for climbing the exterior of a structure. As illustrated in FIG. 4, the actuated linkage arm 30 can wrap the first frame 12a and second frame 12b of the mobile robotic device 10 around the structure 4 in an outside-climbing configuration, so that exposed portions of the continuous tracks 14a, 14b face toward each other and contact opposite outer surfaces of the structure 4. The continuous tracks can be driven to move the mobile robotic device up and down the structure. Many different structural geometries, including for example a pole, can be climbed in this outside-climbing configuration.

Figure 5A:
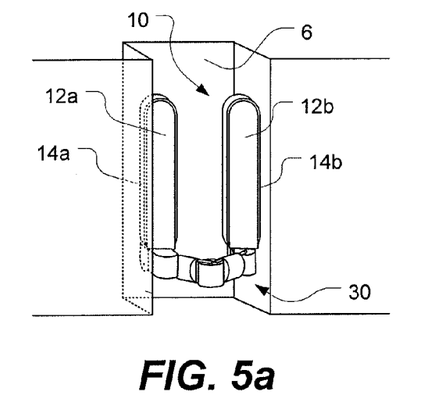
FIGS. 5a and 5b are perspective illustrations of the mobile robotic device of FIG. 1 configured into multiple inside-climbing poses.
Figure 5B:
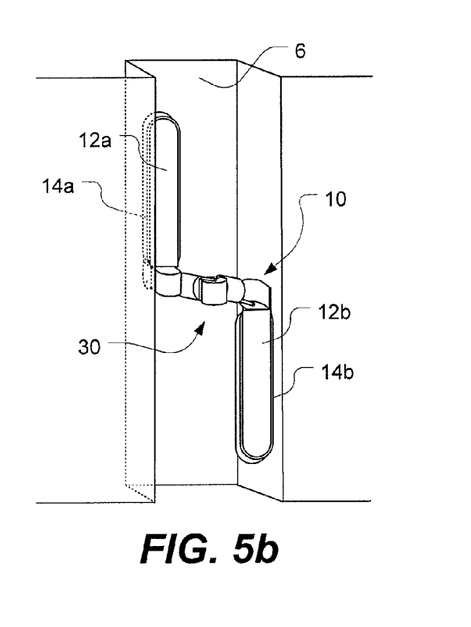

The mobile robotic device can also be configured into yet another traveling pose suitable for climbing the interior of a structure. FIGS. 5(*a*) and 5(*b*) illustrate two different inside-climbing configurations. In an inside-climbing configuration, the actuated linkage arm 30 can orientate the first frame 12a and second frame 12b of the mobile robotic device 10 so that exposed portions of the continuous tracks 14a, 14b face away from each other and are in contact with opposite inner surfaces of the structure 6. The inside-climbing configuration can be useful for climbing pipes, chimneys, wall interiors, and the like.

As a result of its ability to reconfigure itself into a variety of different poses, the mobile robotic device can travel across a wide variety of terrains and surfaces, including for example, climbing inside or outside vertical structures (e.g., pipes, chimneys, etc.), crossing gaps, and crawling across inclined and flat surfaces. The mobile robotic device can therefore easily enter small openings, such as vent pipes, ventilation shafts, waste water systems and the like. The mobile robotic device can thus be operated in a stealthy manner, taking advantage of available cover and traveling routes that reduce the likelihood of detection. As a specific example, the mobile robotic device may enter into an environment via a sewer system, traveling through pipes and into building structures, thus bypassing security systems or guard personnel.

It will be appreciated, however, that various other arrangements of a mobile robotic device can be used, and the present invention is not limited to this particular arrangement.

Figure 6:
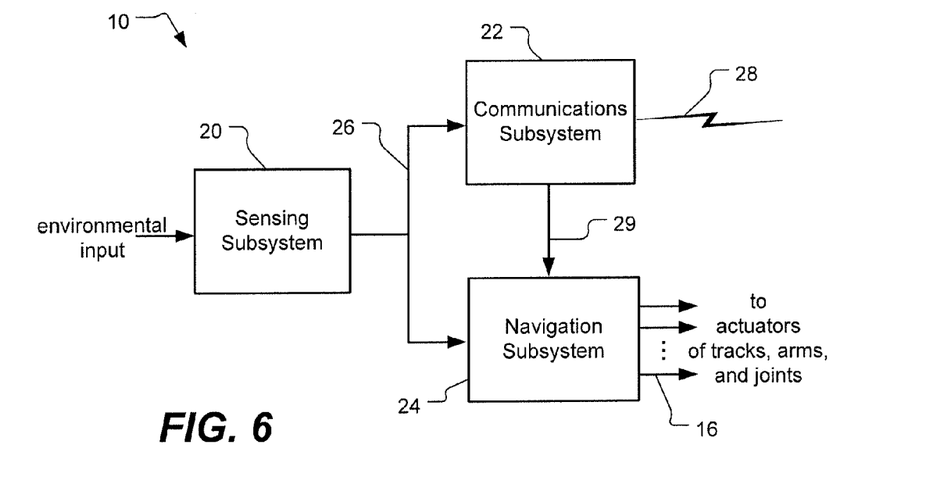
FIG. 6 is a partial block diagram of the mobile robotic device of FIG. 1.

FIG. 6 provides a block diagram of the mobile robotic device 10, depicting the several sub-systems of the mobile robotic device 10, including, but not limited to: a sensing subsystem 20, a communication subsystem 22, and a navigation subsystem 24. The sensing subsystem 20 is used for sensing information about the environment, and can include one or more sensors such as a camera, a stereo camera, an imaging device, a sound sensor, an electromagnetic sensor, a chemical sensor, a radar, a lidar, a range finder, a scanning range finder, a sonar, a contact sensor, a sniff sensor, a Global Positioning System (GPS) receiver, an inertial measurement unit, an orientation sensor, or any combination thereof. In one aspect, the sensors can function to sense various conditions or elements already existing within the environment. In another aspect, the sensors can function to sense and receive information pertaining to a result of something that is emitted or otherwise released from or introduced by the robotic vehicle (an emission) into the environment in order to cause what may be termed a disturbance within the environment. The emission may include, but is not limited to, a mechanical or physical vibration, an acoustic vibration, a thermal emission, a chemical substance configured to react with the environment, an electro-magnetic emission, and others. The sensors can monitor and sense the response of the emission within the environment and can communicate the information in a similar manner as other sensors. As such, the present invention contemplates the robotic vehicle as further comprising means for generating such a disturbance within the earth-surface environment. Means for generating may comprise a mechanical or physical or acoustic vibration emitter, a thermal energy emitter, a chemical substance release system or device, an electro-magnetic emitter, and others.

Information 26 obtained from the sensing subsystem 20 can be communicated by the communication subsystem 22 via a communication link 28 to a remote location, such as, for example, a command post or remote control center. Alternatively, if detection of the robotic device within the area is a concern, such as during a covert mission, the robotic device may be equipped with one or more memory storage devices that store the sensed information for later retrieval.

The navigation subsystem 24 provides for movement of the mobile robotic device 10. The navigation subsystem can be autonomous or remotely controlled. For example, autonomous navigation may be performed based on the information 26 received from the sensing subsystem and pre-programmed navigation rules or scenarios. As another example, remote control can be performed via commands 29 received from the communications subsystem originating from a remote location. The navigation system includes outputs 16 that actuate or otherwise operate the tracks 14a, 14b, arms 18a, 18b, 18c, 18d and joints 32, 34, 36, 38 of the mobile robotic device.

A surveillance network can be formed or established by deploying one or more mobile robotic devices, such as the type described in FIGS. 1-6, into an environment to be monitored. The environment can be an earth-surface environment, which is distinguishable from an airborne environment, and which can include dry land, sub-surface, aquatic or water, and amphibious environments, etc. Overall operation of a surveillance network can include several phases, such as 1) emplacement and possible strategic positioning of the surveillance network into an earth-surface environment, 2) monitoring of the environment, and 3) dismantling of the surveillance network.

Emplacement of the surveillance network is primarily concerned with getting the mobile robotic devices into positions from which the desired network can be established and surveillance conducted. For example, emplacement of the surveillance network can include configuring the mobile robotic devices for surreptitious entry into the earth-surface environment, deploying or inserting one or more mobile robotic devices covertly into the earth-surface environment, configuring the mobile robotic device into a traveling pose selected from a plurality of available traveling poses, and directing the mobile robotic device with the navigation system to a sensing location within the earth-surface environment, wherein the surveillance network can be established.

Figure 7:
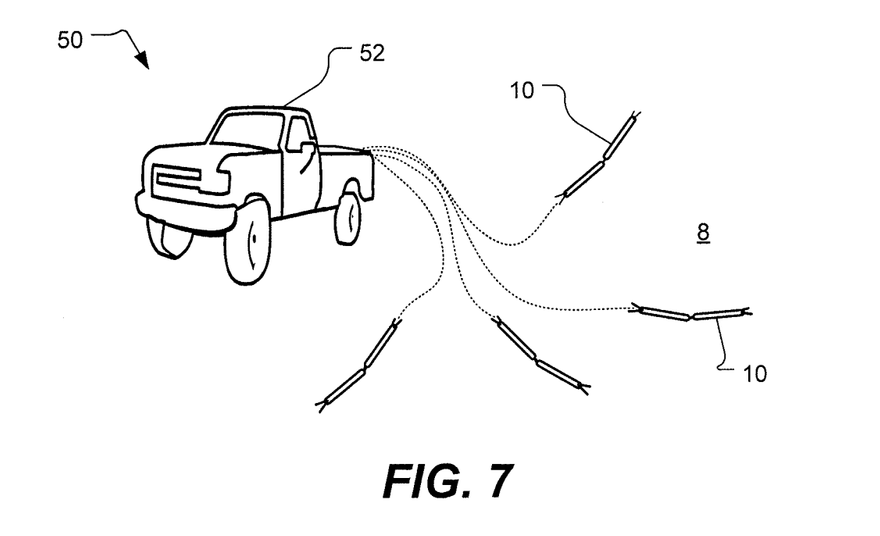
FIG. 7 is an illustration of a deployment scenario using a ground carrier vehicle in accordance with an embodiment of the present invention

The mobile robotic devices may be carried by a carrier vehicle and deployed from the carrier vehicle into the earth-surface environment. The carrier vehicle may be, by way of example, a ground vehicle, an airborne vehicle, a projectile, a waterborne vehicle, or the like. For example, FIG. 7 illustrates one deployment or insertion scenario 50, where a ground vehicle 52 transports a plurality of mobile robotic devices 10 into an earth-surface environment 8. During transportation, the mobile robotic devices may be concealed on the ground vehicle, for example, under a tarp, under the undercarriage of the vehicle, within a structure on the vehicle, etc. When the ground vehicle has reached a desired position within the environment, the mobile robotic devices 10 may move from the ground vehicle into the environment. For example, the mobile robotic devices may be dropped from the ground vehicle, crawl out of the vehicle, or otherwise surreptitiously move from the vehicle into the environment. Although the ground vehicle is illustrated in FIG. 7 as a truck, the ground vehicle may be a car, a tank, a larger UGV, or various other ground vehicles known in the art.

FIG. 7 further illustrates a plurality of robotic devices 10 which may be deployed and caused to operate in combination with one another, wherein the robotic devices may be linked or operated together in a strategic or coordinated manner. For example, by combining the sensed information from the collection of robotic devices, which collectively constitute an array, the environment may be imaged without the use of a camera.

Figure 8:
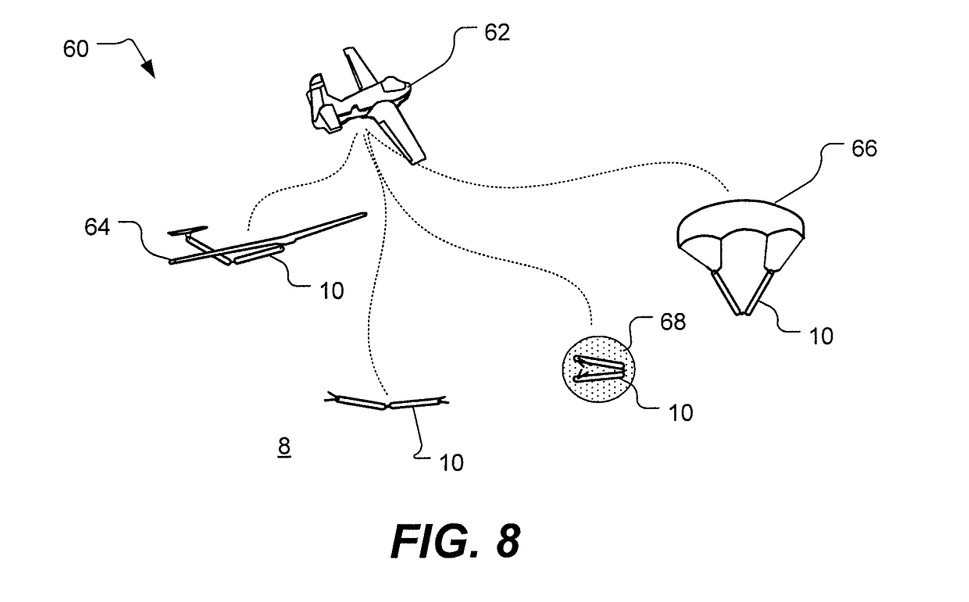
FIG. 8 is an illustration of a deployment scenario using an airborne carrier vehicle in accordance with an embodiment of the present invention.

FIG. 8 illustrates another deployment or insertion scenario 60, where an airborne carrier vehicle 62 drops the one or more mobile robotic devices 10 into the earth-surface environment 8. The robotic devices can be configured in a variety of ways for surreptitious entry into the environment. For example, the robotic devices may be configured with a fall preservation device that essentially preserves the robotic device once dropped from the airborne carrier vehicle. In one aspect, the fall preservation device may comprise a flight control device (e.g., glider foils 64, parafoil 66). The robotic device may be configured in a gliding mode, and caused to operate with the glider foils, which may comprise detachable wings 64. If desired, control surfaces on the wings can be actuated by linkages coupled to the articulating arms. In another aspect, the fall preservation device may comprise a fall arresting device, such as a parachute. If desired, control of parachute or parafoil lines can also be provided by the arms.

As yet another example, lightweight mobile robotic devices can be dropped into the environment upon being equipped or supported by a fall preservation device in the form of a shock-absorbing structure 68 that functions to absorb or cushion the impact. Although shown in FIG. 7 as an airplane, the airborne vehicle 62 may be an airplane, glider, unmanned aerial vehicle, a cruise missile, balloon, a helicopter, or other airborne vehicles as known in the art.

Figure 9:
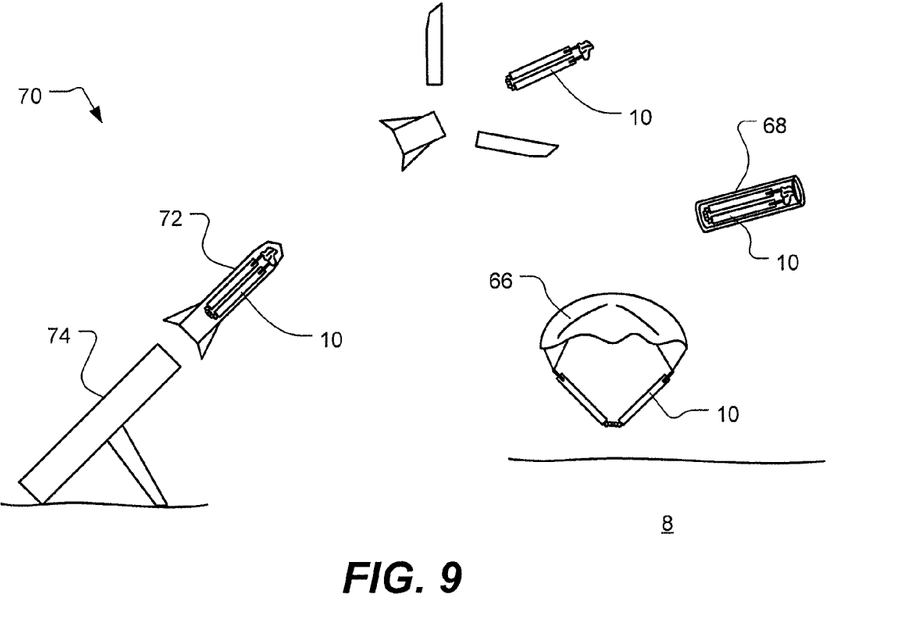
FIG. 9 is an illustration of a deployment scenario using a projectile or rocket in accordance with an embodiment of the present invention.

FIG. 9 illustrates yet another deployment or insertion scenario 70 in which the mobile robotic device 10 is packaged or enclosed or housed within a carrier vehicle in the form of a projectile 72, which may be shot or otherwise delivered into the earth-surface environment 8. The projectile 72 an be a hollow shell fired from a cannon, mortar or rail gun 74, or in another aspect the projectile 72 can comprise a self-propelled rocket with its own power or thrust source. The projectile 72 may comprise a separate protective structure (e.g., shock-absorbing shell), or may function as a protective structure itself. In one exemplary embodiment, the projectile can be launched, and after reaching a predetermined height above the target environment 8, the projectile can open to release the mobile robotic device in mid-air, which can then return to earth with the parachute 66 or shell or shock-absorbing structure 68, similar to the method described in the previous insertion scenario.

Figure 10:
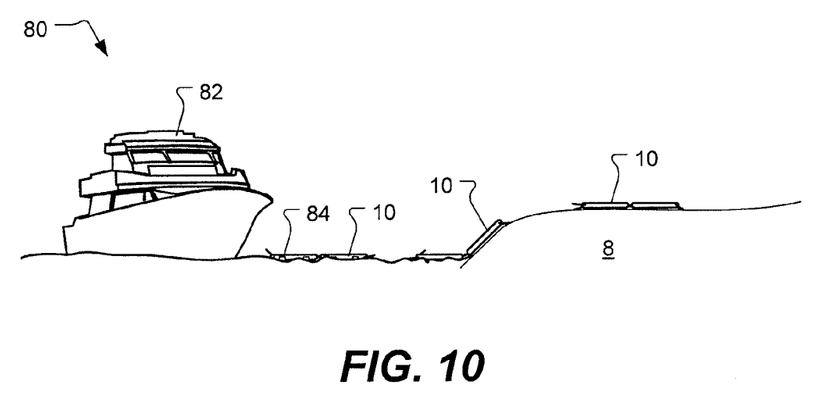
FIG. 10 is an illustration of a deployment scenario using a waterborne carrier vehicle in accordance with an embodiment of the present invention.

FIG. 10 illustrates yet another deployment scenario 80, where a waterborne carrier vehicle 82 deploys or inserts the one or more mobile robotic devices 10 into the earth-surface environment 8. The robotic device can be configured to move in a swimming mode from the waterborne vehicle into the environment. For example, swimming may be performed by rotating the tracks, rotating the articulating arms, or a combination of both. If desired, the mobile robotic device may include buoyancy modules 84 attached to the arms or frames to enhance operation in water. Although shown in FIG. 10 as a ship, the waterborne carrier vehicle 82 may be a raft, submarine, or other waterborne vehicles known in the art.

Still other deployment scenarios exist. In one aspect, deployment may be carried out by living subjects, such as various individuals, (e.g., ground troops), animals, etc. In this scenario, the robotic devices may be configured for transport or carrying and packaged into compact, protective, carryable or cartable structures or carriers (e.g., sleeves, canisters, tubes, backpacks, etc.), wherein the living subjects may transport and subsequently facilitate release of the robotic devices, or more tactically unpack and configure the robotic devices for delivery or deployment and operation within the area to be surveyed or observed.

In another aspect, the robotic devices may be deployed via passive means, such as by releasing them into or within a natural route, which may include, but is not limited to, a river, down a hill, a tide of an ocean, a prevailing wind, etc.

Once the one or more mobile robotic devices 10 have been placed into the earth-surface environment 8, they may move into positions from which data is to be collected under control of the navigation subsystem 24. The positions may be predefined, for example, based on a map or geolocation system coordinates. As an alternative, the positions may be defined within the surveillance network in a relative sense, for example, specifying that the robotic devices are to assume predefined relative spacing within a generally defined area.

The mobile robotic devices 10 may take up concealed positions within the environment. For example, when entry includes crawling into building infrastructure such as a waste water system, ventilation system, or the like, the mobile robotic devices may remain within the infrastructure, located near an interface point with human-occupied space. For example, a mobile robotic device may be positioned near a ventilation inlet or outlet, within a floor drain, etc.

Monitoring of the environment by the mobile robotic devices 10 uses the sensing subsystem 20. Depending on the type of sensors included within the sensing subsystem, the mobile robotic device may receive electromagnetic radiation from the environment, receive acoustic energy from the environment, image the environment, sample the environment, and perform similar operations and functions. Data obtained from the sensing subsystem can be communicated via the communication subsystem 22 to a remote location, or it may be stored on one or more memory storage devices for later retrieval.

Figure 11:
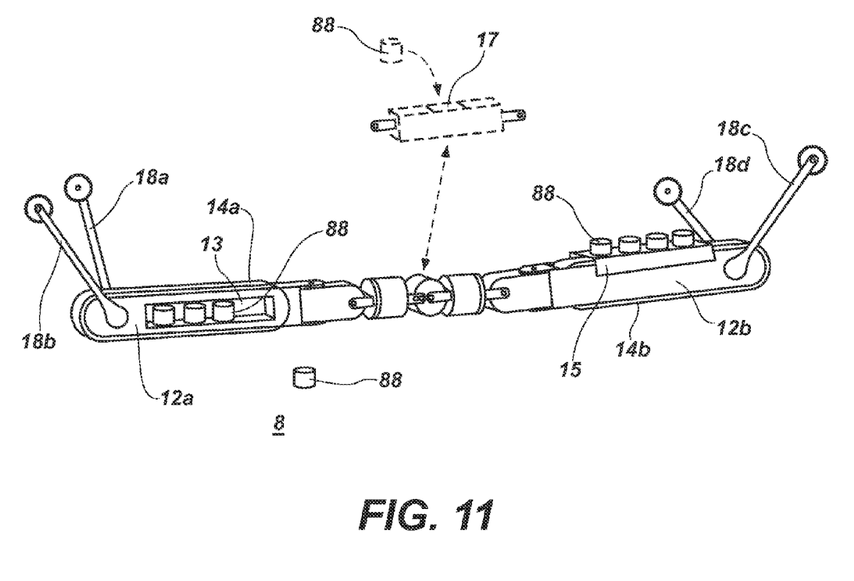
FIG. 11 is a perspective illustration of an exemplary mobile robotic device carrying and deploying a variety of utility pods, in accordance with an embodiment of the present invention.

The establishment of the surveillance network can further include using the mobile robotic device 10 to deposit one or more utility pods at the sensing location within the earth-surface environment, as illustrated in FIG. 11. The utility pods 88 can include a variety of pod types that can be selected according to the surveillance mission objectives, including a sensor pod (that can include similar sensing functions as described above for the robotic device), a communications relay pod, an explosives pod, an alarm pod, a recording pod, an incapacitating pod (e.g., a stun gun type pod, a smoke or gas release type pod, etc.), an effector pod (pods that emit or introduce a signal, substance, etc. into the environment to cause a response or disturbance to be sensed by a sensor pod or sensors on the robotic device itself), a concealment/escape pod, etc.

The utility pods 88 can be stowed or carried within a payload compartment or bay 13 formed into a frame 12*a* of the mobile robotic device, on a carrier device 15 supported above a continuous track 14*b*, within a payload formed into a mid-section structure of the articulated linkage (see auxiliary payload bay 17 shown in phantom, which auxiliary payload 17 may be part of a component configured to be operable with and part of an alternately configured articulated linkage arm), or by the arms 18. The utility pods can be deposited at a sensing location within the earth-surface environment 8 using a variety of techniques, including the use of the articulating arms 18*a*, 18*b*, 18*c*, 18*d* disposed on opposing ends of the frame units 12*a*, 12*b* with continuous tracks 14*a* and 14*b*, as well as activated linkages, spring-loaded release mechanisms, tilting carrier supports (not shown), etc. After the objectives of the surveillance network have been achieved, one or more of the utility pods can also be retrieved from the remote sensing location using the mobile robotic device 10.

Figure 12:
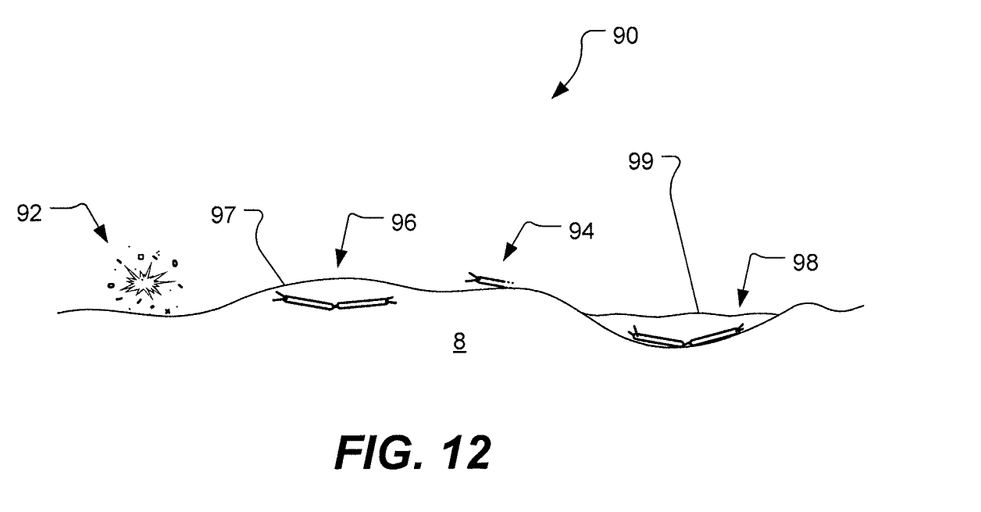
FIG. 12 is an illustration of several different scenarios for removal of a mobile robotic device from within an environment in accordance with an embodiment of the present invention.

When the surveillance mission is complete, the final phase of operation can be the dismantling of the surveillance network. Dismantling the surveillance network can include removing the plurality of mobile robotic devices 10 from easily detectable locations within the environment into a predetermined concealed state. A variety of techniques 90 can be used for removing the plurality of mobile robotic devices from the environment, as illustrated in FIG. 12.

In one exemplary embodiment, the mobile robotic devices may employ an explosive or incendiary self-destruct technique 92 to destroy the mobile robotic device.

While explosive- or incendiary-type self-destruct mechanisms are effective, more discrete self-destruct mechanisms can be employed as well. For instance, the mobile robotic device may include a dissolving technique 94 which involves carrying and releasing a chemical mixture that can operate to dissolve all or part of the mobile robotic device.

As another example, the mobile robotic device 10 may be directed into a difficult to detect position within the environment for a hide-in-place version of dismantling of the surveillance network. For example, the mobile robotic device may use a burrowing technique 96 to burrow into the ground 97 within the environment 8. The burrowing technique can include self-concealment under a trash pile, within a growth of dense vegetation, inside a cave or rock crevasse, and upright against a tree or other structure, etc. A submersion technique 98 can also be particularly effective, for instance, when the mobile robotic device conceals itself in the mud, sediment or rocks at the bottom of a body of water 99.

Alternately, dismantling the surveillance network may include removing the one or more mobile robotic devices entirely from the environment to prevent their easy detection. For example, the mobile robotic devices may exit the environment in the same manner in which they entered, by crawling or swimming back to a carrier vehicle. If desired, a homing device can be activated in the carrier vehicle to aid the mobile robotic devices in returning the carrier vehicle.

Figure 13:
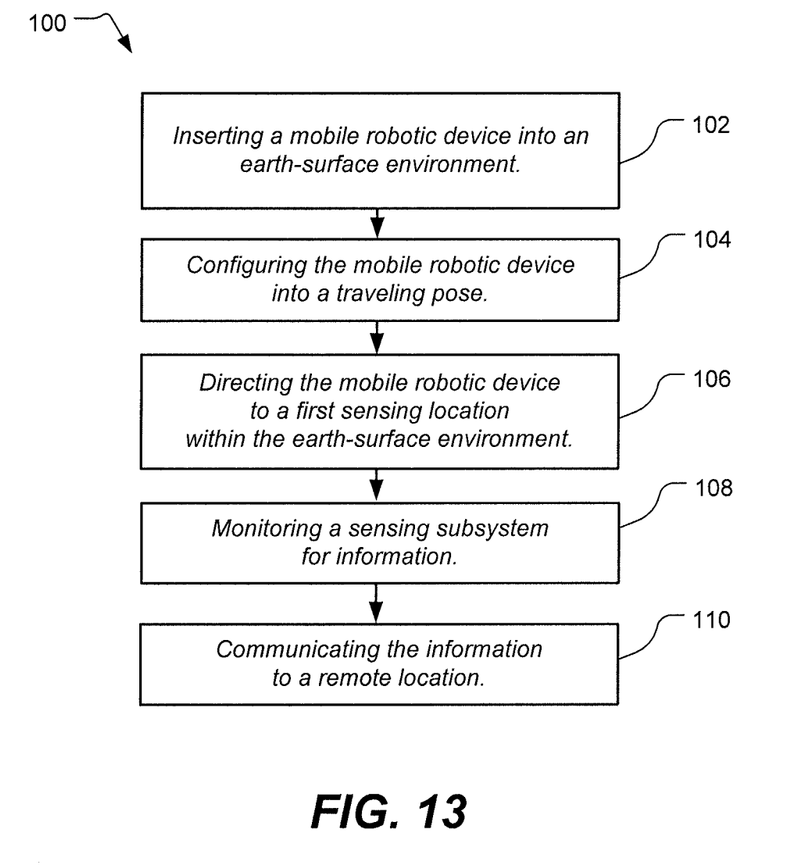
FIG. 13 is a flow chart of a method of deploying a surveillance network into an environment in accordance with an embodiment of the present invention.

FIG. 13 provides a summary of a method for gathering information from within an earth-surface environment. The method 100 includes inserting 102 a mobile robotic device into an earth-surface environment. For example, the mobile robotic device may be a ground robotic device that include a sensing subsystem, a communications subsystem, and a navigation subsystem, as described above. The method can also include configuring 104 the mobile robotic device into a traveling pose that has been selected from a plurality of available traveling poses, and directing 106 the mobile robotic device with the navigation system to a sensing location within the earth-surface environment. The method 100 can further include monitoring 108 the sensing subsystem for information using sensors disposed on the mobile robotic device or deployed utility pods, and communicating 110 the information from the sensing subsystem to a remote location.

Summarizing and reiterating to some extent, mobile robotic devices can be covertly deployed into an environment to collect sensor data which is stored or communicated to a remote location. By using small, covert robotic devices, surreptitious entry into and exit from the environment is possible. The mobile robotic devices can be made difficult to detect when no longer needed by hiding the devices within the environment or removing the devices from the environment. Applications of surveillance networks as described herein can include, without limitation, military operations, law enforcement, espionage, and intelligence gathering.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function limitation are expressly recited in the description herein. Accordingly, the scope of the invention should be determined solely by the appended claims and their legal equivalents, rather than by the descriptions and examples given above.

What is claimed and desired to be secured by Letters Patent is:

1. A system for gathering information from within an earth-surface environment, comprising:
   at least one mobile robotic device operable on an earth surface of an earth-surface environment, which is configurable into at least one deployment pose and a plurality of traveling poses, the mobile robotic device comprising:
   a multi-frame body having multiple single-track units coupled by an active articulating linkage;
   a navigation subsystem for selecting the optimum traveling pose for the earth- surface environment;
   a sensing subsystem for collecting information from the earth-surface environment; and
   a carrier vehicle operable with the mobile robotic device as configured in the at least one deployment pose to facilitate deployment of the mobile robotic device into the earth-surface environment, wherein the mobile robotic device is housed in a projectile deliverable from the carrier vehicle to the earth surface of the earth-surface environment and reconfigurable into one of the plurality of traveling poses so as to enable the mobile robotic device to locate to a first sensing location within the earth-surface environment.

2. The system of claim 1, further comprising a remote command center operable to receive the information from the at least one mobile robotic device, wherein a network is established between the remote command center and the at least one mobile robotic device operating within the earth-surface environment, and wherein the network may be selectively dismantled by the removal of the at least one mobile robotic device from the earth-surface environment.

3. The system of claim 1, wherein the plurality of traveling poses includes a tank pose, a train pose, a zig-zag pose, an outside-climbing pose, and an inside climbing pose.

4. The system of claim 1, further comprising at least one utility pod deployable by the mobile robotic device at a second covert sensing location within the earth-surface environment and having at least one sensor and at least one communications subsystem for transmitting information.

5. The system of claim 4, wherein the at least one utility pod is selected from the group consisting of a sensor pod, a communications relay pod, an explosives pod, an alarm pod, a recording pod, an incapacitating pod, a concealment pod, an effector pod and combinations thereof.

6. The system of claim 4, wherein the robotic device comprises a payload bay for stowing one or more of the utility pods.

7. The system of claim 1, wherein the mobile robotic device further comprises a communications subsystem for establishing bi-directional communication with a remote location for sharing the collected information.

8. The system of claim 7, wherein the communications subsystem of the mobile robotic device further comprises a communications relay between the at least one utility pod and the remote command center.

9. The system of claim 1, wherein the carrier vehicle is selected from the group consisting of a ground vehicle, an aircraft, a balloon, a boat, a submarine, and any combination of these.

10. The system of claim 1, wherein the projectile is self-powered.

11. The system of claim 1, further comprising packaging the at least one robotic device as configured within a deployment configuration.

* * * * *